(12) United States Patent
Tong

(10) Patent No.: US 6,455,781 B1
(45) Date of Patent: Sep. 24, 2002

(54) THERMOCOUPLE CERAMIC BEAD INSULATOR

(75) Inventor: Lee Kok Tong, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 0 days.

(21) Appl. No.: 09/934,547

(22) Filed: Aug. 23, 2001

(51) Int. Cl.[7] ................................................. H01B 7/00
(52) U.S. Cl. ....................................................... 174/111
(58) Field of Search .............................. 174/111, 28, 36, 174/138 D; D26/10; 219/550; 138/120

(56) References Cited

U.S. PATENT DOCUMENTS

| | | | | |
|---|---|---|---|---|
| 1,829,785 A | * | 11/1931 | Christian | 219/550 |
| 1,899,933 A | * | 3/1933 | Bennett | 219/550 |
| D214,565 S | * | 7/1969 | Toohill | D26/10 |
| 4,663,108 A | * | 5/1987 | Carlstrom | 376/136 |
| 4,937,434 A | | 6/1990 | Nakao | 219/390 |
| 4,950,870 A | | 8/1990 | Mitsuhashi et al. | 219/390 |
| 5,043,023 A | | 8/1991 | Bentley | 136/232 |
| 5,811,761 A | | 9/1998 | Kita et al. | 219/270 |
| 6,102,565 A | | 8/2000 | Kita et al. | 374/179 |
| 6,161,381 A | * | 12/2000 | Lohrmann | 60/523 |

* cited by examiner

*Primary Examiner*—Chau N. Nguyen
(74) *Attorney, Agent, or Firm*—George O. Saile; Rosemary L.S. Pike

(57) ABSTRACT

An improved thermocouple having a ceramic bead insulator is described. A pair of wires in parallel is joined at a first end to a thermocouple and joined at a second end to a connector. The pair of wires is threaded through each of a series of interlocking ceramic beads wherein the series of interlocking ceramic beads forms the ceramic bead insulator.

16 Claims, 2 Drawing Sheets

THERMOCOUPLE CERAMIC BEAD INSULATOR

BACKGROUND OF THE INVENTION

(1) Field of the Invention

The invention relates to a thermocouple device and, more particularly, to a thermocouple device having a ceramic bead insulator.

(2) Description of the Prior Art

A thermocouple is a temperature sensing device. In integrated circuit manufacturing, thermocouples are used, for example, to measure the temperature in an oxidation furnace. For example, an oxidation furnace may be used for growing of oxide, drive-in of dopants, low pressure chemical vapor deposition, annealing, and so on. All of these processes must be performed at specific temperatures. A thermocouple is used to check the accuracy of the temperature setting of the furnace.

FIG. 1A illustrates a typical thermocouple having a ceramic bead-type insulator. A pair of parallel wires are connected at one end to a thermocouple 10 and at the opposite end to a connector plug 12. The ceramic beads shield the wires and prevent the wires from shorting and twisting. This type of thermocouple may be used in any type of high temperature environment in which flexibility is desired; that is, the wires can bend.

In the thermocouple design of the prior art, shorting of the thermocouple wires may occur. For example, as shown in FIG. 1B, because of the ceramic bead 14 design, the thermocouple wires between the beads are easily exposed. The exposed wire 16 is easily shorted when heated. Because of thermal expansion of the wires, the wires may be twisted or deformed 18. Twisted or deformed wires also are shorted easily when heated. Shorting of the wires results in incorrect temperature sensing causing loss of control of the oxidation furnace temperature, and the potential of scrapped wafer lots.

It is desired to improve the design of the ceramic bead insulated thermocouple so that the potential for shorting is greatly reduced.

U.S. Pat. No. 5,043,023 to Bentley shows a metal-sheathed thermocouple having a ceramic insulator between the wires and the sheath. U.S. Pat. No. 5,811,761 to Kita et al and U.S. Pat. No. 6,102,565 to Kita et al disclose thermocouples having ceramic sheaths molded around the wires wherein the ceramic sheaths are encased in a protective pipe. U.S. Pat. No. 4,937,434 to Nakao shows movable thermocouples in a furnace. U.S. Pat. No. 4,950,870 to Mitsuhashi et al shows a heater and a thermocouple thermometer.

SUMMARY OF THE INVENTION

Accordingly, a principal object of the present invention is to provide an improved thermocouple having a ceramic bead insulator.

In accordance with the objects of this invention an improved thermocouple having a ceramic bead insulator is achieved. A pair of wires in parallel is joined at a first end to a thermocouple and joined at a second end to a connector. The pair of wires is threaded through each of a series of interlocking ceramic beads wherein the series of interlocking ceramic beads forms the ceramic bead insulator.

BRIEF DESCRIPTION OF THE DRAWINGS

In the accompanying drawings forming a material part of this description, there is shown.

DESCRIPTION OF THE PREFERRED EMBODIMENTS

Figure 2A:
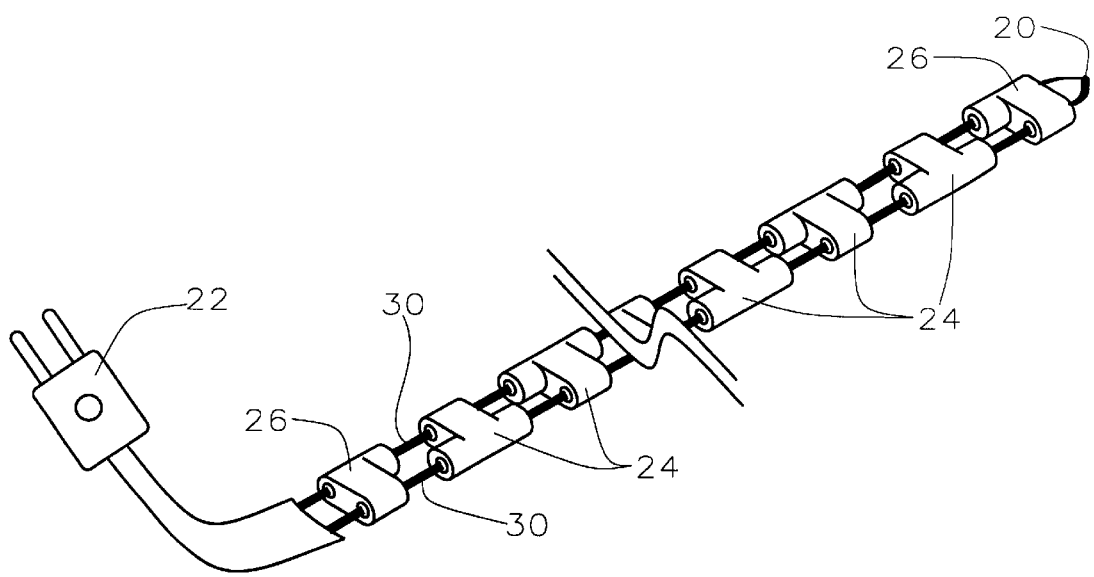
FIGS. 2A and 2B show a preferred embodiment of a ceramic bead-type thermocouple of the present invention.
Figure 2B:
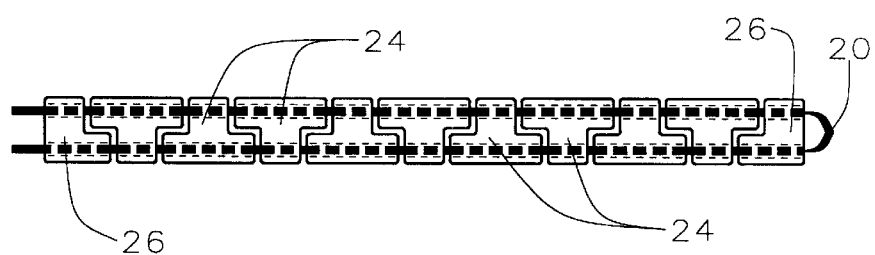

The present invention provides an improved ceramic bead-type thermocouple. FIGS. 2A and 2B illustrate the improved ceramic bead thermocouple of the present invention. Referring now more particularly to FIG. 2A, there is shown an isometric view of the improved ceramic bead-type thermocouple of the present invention. A pair of parallel wires 30 are connected at one end to a thermocouple 20 and at the opposite end to a connector plug 22. The connector plug is connected to a temperature controller, not shown.

Figure 1A:
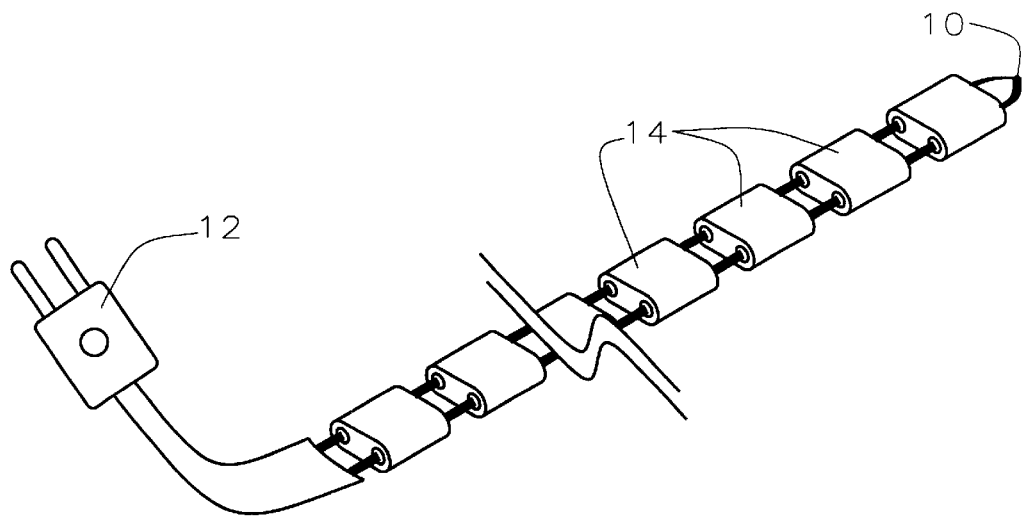
FIGS. 1A and 1B show a ceramic bead-type thermocouple of the prior art.
Figure 1B:
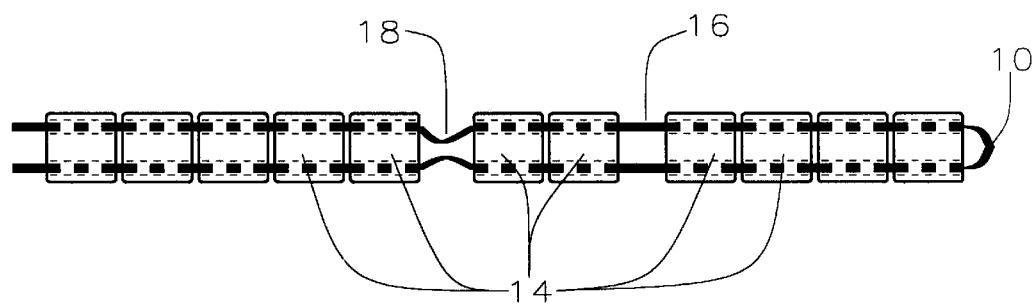

The thermocouple wires 30 are insulated by ceramic beads 24. The unique design of the ceramic beads greatly reduces the likelihood of exposing and shorting the wires 30. The ceramic beads in the prior art are rectangularly-shaped as shown in FIGS. 1A and 1B. FIG. 1B shows that the wires can be exposed easily between beads, especially after thermal expansion of the wires.

Referring now to FIG. 2B, the unique shape of the ceramic beads 24 of the present invention can be seen. The ceramic beads are formed in a T-shape. The T-shaped beads are interlocked so that a wide portion of a first T-shaped bead is adjacent to a narrow portion of a second T-shaped bead.

L-shaped beads 26 may be used as the capping beads on each end of the thermocouple, as shown. The wide portion of the L-shaped beads on each end are adjacent to a narrow portion of the adjacent T-shaped beads.

Because of the interlocking of the T-shaped beads, the wires are not exposed easily and therefore, are not shorted easily. The flexibility of the ceramic bead thermocouple design is maintained. Ceramic or any other insulator material that can withstand high temperatures can be used in making the T-shaped and/or L-shaped beads.

The thermocouple of the present invention avoids the shorting problems of the prior art, thus preventing loss of temperature control, and the potentially scrapped wafer lots. The unique ceramic bead design; i.e., T-shaped interlocking beads; greatly reduces the probability of exposing and shorting of the thermocouple wires.

While the invention has been particularly shown and described with reference to the preferred embodiments thereof, it will be understood by those skilled in the art that various changes in form and details may be made without departing from the spirit and scope of the invention.

What is claimed is:

1. A thermocouple having a ceramic bead insulator comprising:

a pair of wires in parallel joined at a first end to a thermocouple and joined at a second end to a connector; and a series of interlocking ceramic beads wherein each of said interlocking ceramic beads has a T-shape wherein said pair of wires is threaded through each of said interlocking ceramic beads wherein said series of interlocking ceramic beads forms said ceramic bead insulator and wherein a wide portion of said T-shape of a first one of said ceramic beads is adjacent to a narrow portion of said T-shape of a second one of said ceramic beads.

2. The thermocouple according to claim 1 wherein a first ceramic bead in said series and a last ceramic bead in said series have an L-shape and wherein all other interlocking ceramic beads in said series have a T-shape.

3. The thermocouple according to claim 2 wherein a wide portion of said L-shape of said first ceramic bead is adjacent to a narrow portion of said T-shape of a second ceramic bead and wherein a wide portion of said T-shape of said second ceramic bead is adjacent to a narrow portion of said T-shape of a third ceramic bead.

4. The thermocouple according to claim 2 wherein a wide portion of said L-shape of said last ceramic bead is adjacent to a narrow portion of said T-shape of a second ceramic bead and wherein a wide portion of said T-shape of said second ceramic bead is adjacent to a narrow portion of said T-shape of a third ceramic bead.

5. The thermocouple according to claim 1 wherein said pair of wires are kept from shorting and twisting by said series of interlocking ceramic beads.

6. A thermocouple having a ceramic bead insulator comprising:
   a pair of wires in parallel joined at a first end to a thermocouple and joined at a second end to a connector; and
   a series of interlocking T-shaped ceramic beads wherein said pair of wires is threaded through each of said interlocking T-shaped ceramic beads wherein said series of interlocking T-shaped ceramic beads forms said ceramic bead insulator.

7. The thermocouple according to claim 6 wherein a wide portion of said T-shape of a first one of said ceramic beads is adjacent to a narrow portion of said T-shape of a second one of said ceramic beads.

8. The thermocouple according to claim 6 wherein a first ceramic bead in said series and a last ceramic bead in said series have an L-shape and wherein all other interlocking ceramic beads in said series have a T-shape.

9. The thermocouple according to claim 8 wherein a wide portion of said L-shape of said first ceramic bead is adjacent to a narrow portion of said T-shape of a second ceramic bead and wherein a wide portion of said T-shape of said second ceramic bead is adjacent to a narrow portion of said T-shape of a third ceramic bead.

10. The thermocouple according to claim 8 wherein a wide portion of said L-shape of said last ceramic bead is adjacent to a narrow portion of said T-shape of a second ceramic bead and wherein a wide portion of said T-shape of said second ceramic bead is adjacent to a narrow portion of said T-shape of a third ceramic bead.

11. The thermocouple according to claim 6 wherein said pair of wires are kept from shorting and twisting by said series of interlocking ceramic beads.

12. A thermocouple having a ceramic bead insulator comprising:
   a pair of wires in parallel joined at a first end to a thermocouple and joined at a second end to a connector; and
   a series of interlocking ceramic beads wherein said pair of wires is threaded through each of said interlocking ceramic beads and wherein a first ceramic bead in said series and a last ceramic bead in said series have an L-shape and wherein all other interlocking ceramic beads in said series have a T-shape and wherein said series of interlocking ceramic beads forms said ceramic bead insulator.

13. The thermocouple according to claim 12 wherein a wide portion of said T-shape of one of said ceramic beads is adjacent to a narrow portion of said T-shape of an adjacent one of said ceramic beads.

14. The thermocouple according to claim 12 wherein a wide portion of said L-shape of said first ceramic bead is adjacent to a narrow portion of said T-shape of a second ceramic bead and wherein a wide portion of said T-shape of said second ceramic bead is adjacent to a narrow portion of said T-shape of a third ceramic bead.

15. The thermocouple according to claim 12 wherein a wide portion of said L-shape of said last ceramic bead is adjacent to a narrow portion of said T-shape of a second ceramic bead and wherein a wide portion of said T-shape of said second ceramic bead is adjacent to a narrow portion of said T-shape of a third ceramic bead.

16. The thermocouple according to claim 12 wherein said pair of wires are kept from shorting and twisting by said series of interlocking ceramic beads.

* * * * *